United States Patent [19]

Flaherty

[11] 4,258,245
[45] Mar. 24, 1981

[54] RESISTANCE WELDING MACHINE

[75] Inventor: John Flaherty, Sutton in Ashfield, England

[73] Assignee: Metal Box Limited, Reading, England

[21] Appl. No.: 40,868

[22] Filed: May 21, 1979

[30] Foreign Application Priority Data

May 30, 1978 [GB] United Kingdom ............... 24463/78

[51] Int. Cl.³ ............................................. B23K 11/06
[52] U.S. Cl. ....................................... 219/81; 219/83; 219/84
[58] Field of Search ............................ 219/81, 83, 84

[56] References Cited

U.S. PATENT DOCUMENTS

| 1,300,603 | 4/1919 | Gravell | 219/81 |
| 3,102,945 | 9/1963 | Opprecht | 219/81 |

Primary Examiner—E. A. Goldberg
Attorney, Agent, or Firm—Diller, Ramik & Wight

[57] ABSTRACT

A resistance welding machine in which a wire electrode is urged into contact with a workpiece by first and second electrode wheels, the wire having first and second surfaces extending parallel to the axis of the wire and a twisting mechanism located in the path of the wire after the first electrode and before the second electrode for twisting the wire during linear motion of the wire so that the surface of the wire presented to the workpiece at the first electrode wheel is also presented to the workpiece at the second electrode wheel.

14 Claims, 4 Drawing Figures

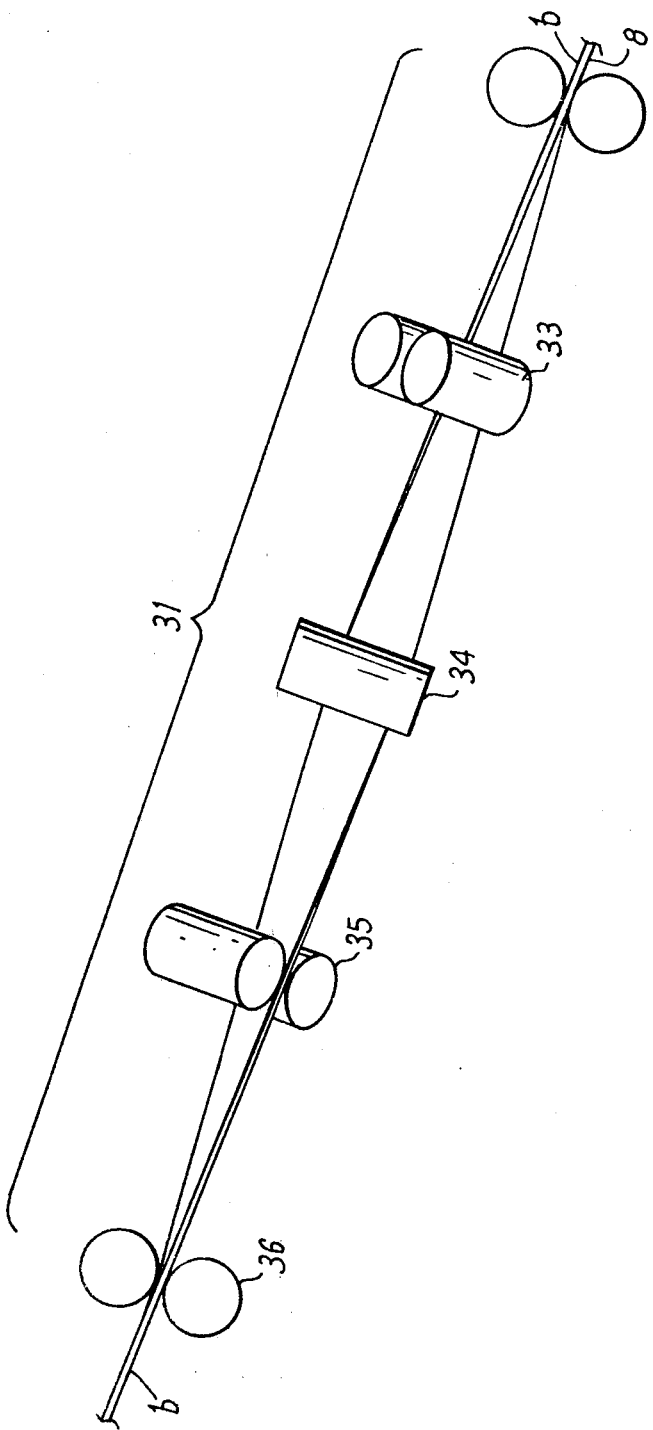

RESISTANCE WELDING MACHINE

This invention relates to a method and apparatus for welding sheet metal and more particularly but not exclusively to a resistance welding machine having means to present an elongate electrode material to a workpiece.

Welding machines are known, which have a pair of electrodes in the form of wheels which press upon a workpiece passed between them so that when an electrical potential difference is applied to the wheels a current passes through the workpiece which is moved to form a linear weld. When such machines are used to weld a substrate coated with a metal of low melting point the periphery of each wheel becomes contaminated with melted coating metal.

British Pat. Nos. 910 206 and 1124888 describe welding machines adapted to overcome this problem by providing the machines with welding wheels, each of which has a peripheral groove. A wire of round cross section is run round the groove in each wheel so that contact between the wheels and workpiece is made through the wire. The wire surface therfore make a small area contact with the workpiece. A drive mechanism moves the wire for continuous synchronous transport to bring a fresh portion of the surface of the wire into engagement with the workpiece as it passes between the wheels. However, in the machines described the wire is guided by a series of pulleys in such a way that the contamination picked up on the wire during welding at the first wheel is carried on the wire and presented to the groove in the second welding wheel. The contamination on the wire so presented can contaminate the grooves in the electrode wheels.

In prior art apparatus a scraper has been incorporated in between the first electrode wheel and the second electrode wheel. However, the scraping action failed to completely remove the contaminants from the wire. The contaminants scraped off were also a nuisance because they were of dusty nature and liable to come to rest on the workpiece; this being unacceptable on workpieces such as can bodies made of decorated tinplate.

In the first aspect this invention provides a method of operating a resistance welding machine of a kind having a wire electrode adapted to be urged into contact with a workpiece by first and second electrode wheels, said method including the steps of feeding a wire having first surface and a second surface to the machine; moving the wire around a first electrode wheel to present the first surface of the wire to the workpiece and the second surface to the first electrode wheel; twisting said wire about its axis through an angle to present said second surface to said second electrode wheel, and presenting the first surface to the workpiece while the second surface of the wire is supported by the second electrode wheel.

A preferred method includes the step of shaping the wire to have a pair of opposed parallel surfaces extending parallel to the axis of the wire.

In a second aspect the invention provides a resistance welding machine of a kind having a wire electrode adapted to be urged into contact with a workpiece by a pair of electrode wheels, said apparatus including a wire having first surface and second surfaces extending parallel to the axis of the wire, and twisting means located in the path of the wire after the first electrode wheel and before the second electrode wheel, said twisting means being adapted to twist the wire during linear motion so that the surface of the wire presented to the workpiece at the first electrode wheel is also presented to the workpiece at the second electrode wheel and is supported by the second surface of the wire engaging the second electrode wheel.

In one embodiment, the apparatus includes means to roll a round wire to have a pair of flat surfaces.

In a preferred embodiment of the apparatus the twisting means includes a first pair of rolls to orientate the wire, a second pair of rolls having their axes set at an angle to the axes of the first pair of rolls, and a further pair of rolls set with their axes parallel to the axes of the first pair of rolls so that a wire passed between the rolls is twisted through 180°. A particular advantage arising from the use of the first and further pairs of rolls is that the twist in the wire is prevented from travelling with the wire.

Various embodiments will now be described by way of example and with reference to the accompanying drawings in which.

Figure 3:
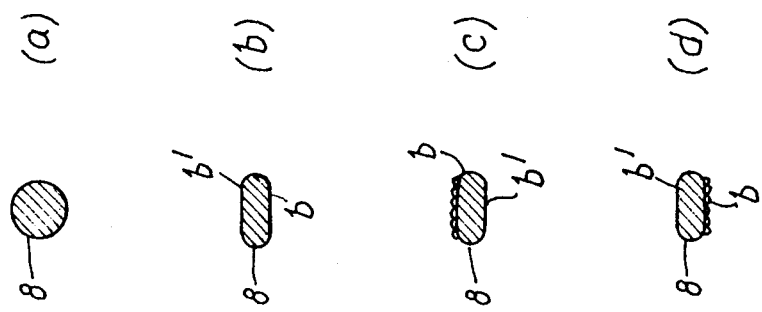
Figure 2:
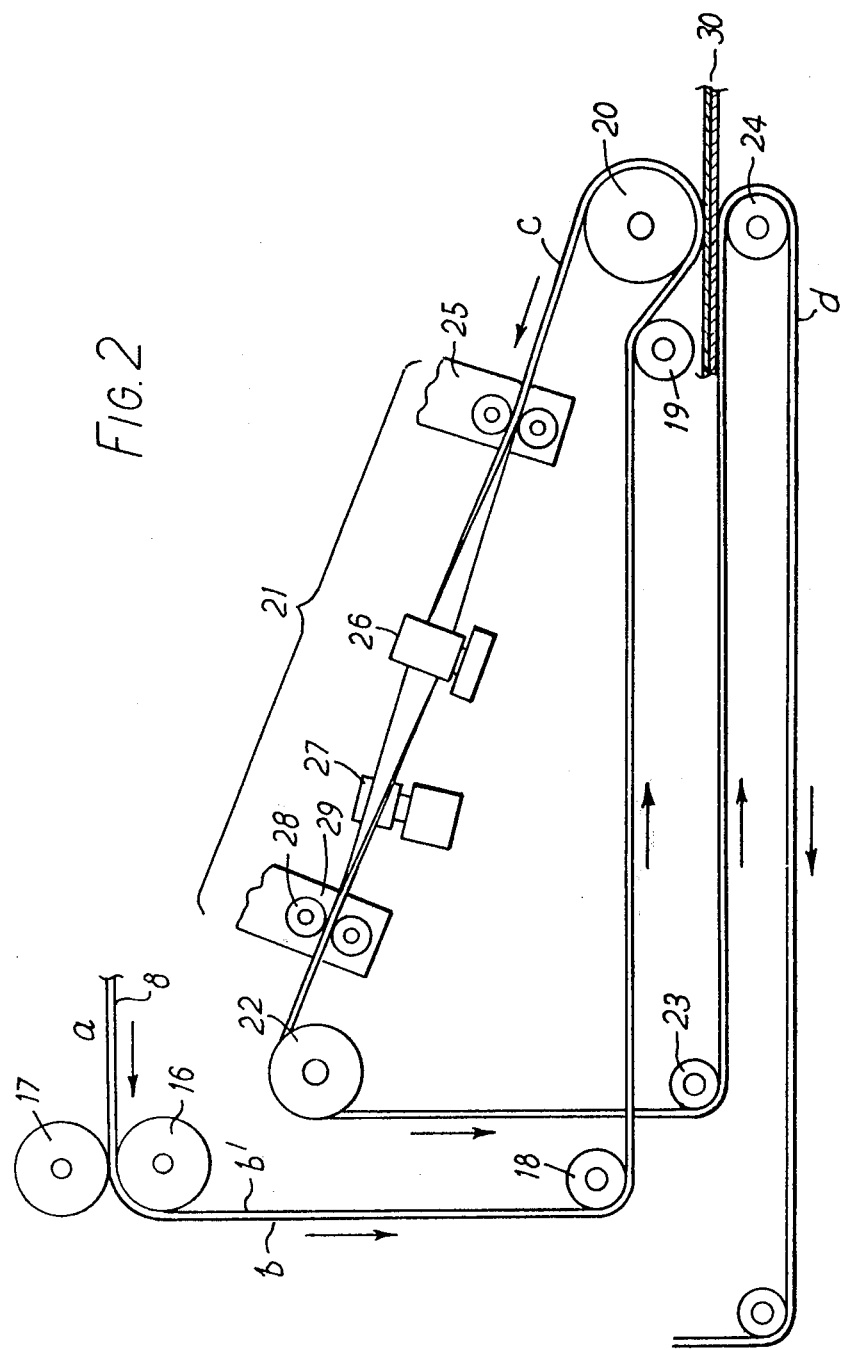
FIG. 2 is a diagrammatic representation of the wire path in a welding apparatus according to the present invention.

FIG. 3 (*a*) to 3 (*d*) show the cross section of the wire at various positions in the apparatus of FIG. 2, and FIG. 4 is a diagrammatic representation of an alternative means to twist the wire.

Figure 1:
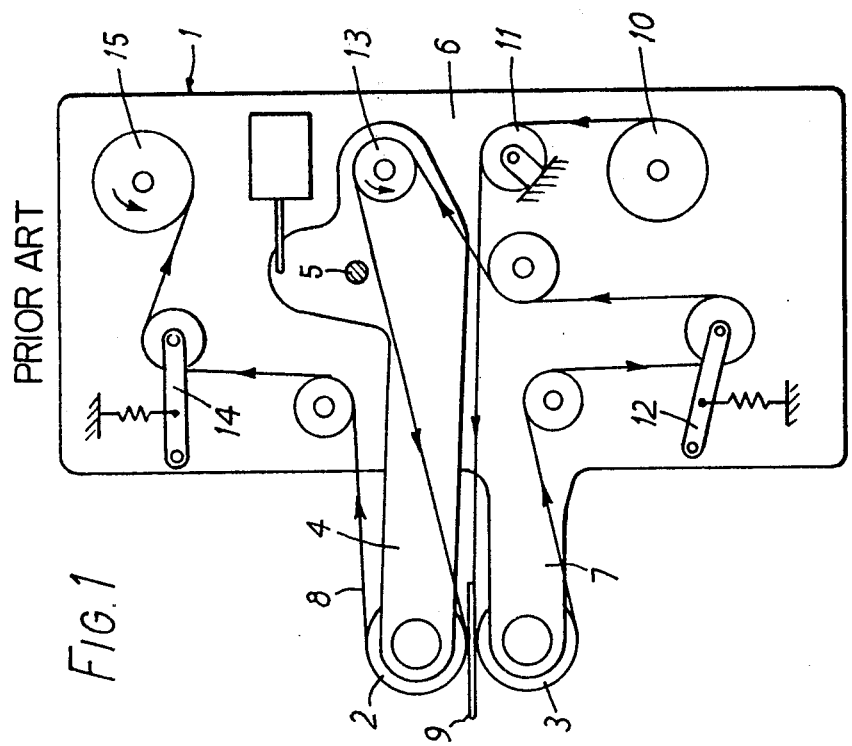
FIG. 1 is a diagrammatic side view of a welding machine according to the prior art.

FIG. 1 shows a prior art welding machine suitable for the continuous welding of sheet metal, such as tinplate or zinc plated steel. In FIG. 1 the machine 1 includes a first electrode wheel 2 and a second electrode wheel 3. The first electrode wheel 2 is mounted for rotation on an arm 4 which is supported by a pivot 5 on the machine frame 6. The second or lower wheel 3 is mounted for rotation on a rigid arm 7 which extends outwardly from the machine frame 6.

Each electrode wheel 2,3 has a peripheral groove adapted to guide a wire 8 of round cross section around each wheel. The wire serves to make the contact between each wheel 2,3 and the workpiece 9 passed between the wheels when the pivoted arm 4 brings the wheels together.

The wire 8 is taken from a reel 10 to pass around a first pulley 11 to the second electrode wheel 3 where it presents a clean contact surface to both the workpiece and the wheel 3. In this embodiment of the prior art the wire 8 passes from the wheel 3 through tensioning means 12 to a pulley 13 which directs the wire to the first electrode wheel 2. After passing around the wheel 2 the wire 8 passes through a further tensioning means 14 to a collection reel 15.

The pulleys and wheels are in the same plane so that the portion of the wire which was presented to the underside of the workpiece 9 at wheel 3 is, in due course, presented to the groove in the roll 2 so that any contamination on the wire can be transferred into the groove in roll 2.

FIG. 2 shows diagrammatically a welding machine having means to twist the wire after the first welding wheel so that a clean surface is presented to the groove in the second welding wheel.

In the embodiment of FIG. 2 a copper wire 8 of round cross section, approximately 1/16" diameter and denoted a, is passed between rolls 16,17 which change the cross section of the wire by imposing two flat surfaces denoted b, b'. The wire 8 passes from the deforming rolls 16,17 around pulleys 18,19 to the first electrode wheel 20. During a welding operation at the first electrode wheel the surface b becomes contaminated by picking up a coating off the upper surface of the workpiece 30. Therefore the contaminated wire 8 depicted in cross section in FIG. 3(c) is passed from the wheel 20 to twisting means generally denoted 21. The wire passing through the twisting means 21 is depicted with its width exaggerated to show the twist. The twisting means 21 twists the wire through 180° so that after passing over redirecting rolls 22,23 the clean surface b' enters the groove of the second electrode wheel 24 the surface b again contacts the workpiece but makes a sufficient contact for welding. Therefore, the wire 8 leaving the wheel 24 at the position denoted d and depicted in cross section in FIG. 3(d) is only contaminated on the surface denoted b. The wire is re-reeled or chopped into small pieces after use. Re use of the contaminated wire is not generally desirable.

The twisting means generally denoted 21 comprise a first pair of rolls 25 which engage with the flattened surfaces b,b' of the wire 8, a second pair of rolls 26, a guide roll 27 and a third pair of rolls 28 mounted with their axes nearly parallel to the axes of the first rolls 25. As the wire passes from the first rolls 25 to the second rolls 26 it is twisted through 90° and on passing to the third set of rolls it is further twisted through 90° to achieve a 180° turn.

As the wire 8 passes between the rolls 28 it has a tendency to move laterally across the face of the rolls and, at worst, become jammed between the ends of the rolls and the mounting block 29. The guide roll 27 supports the wire 8 in a line of travel away from the mounting block 29 to prevent any risk of jamming. Guiding means in the form of roll 27 may not always be necessary.

FIG. 4 shows an alternative wire twisting means 31 which comprises five pairs of rolls 32, 33, 34, 35 and 36. The wire 8 follows a continuous path between the members of each pair of rolls. Each of the pairs of rolls 33, 34, 35 and 36 is mounted on the machine to twist the wire about its axis through an angle substantially equal to 45°, so that the wire emerging from the rolls 36 has been turned through 180° in relation to the wire entering the rolls 32.

The rolls 32, 33, 34, 35 and 36 are preferably made long in axial length in relation to the width of the wire 8 so that some wandering of the wire parallel to the axes of the rolls can be tolerated. Therefore guide means such as the rolls, 27 in FIG. 2, are not essential to the embodiment of FIG. 4.

Upon close examination of FIG. 2 it will be seen that the wire 8 bends around the upper rolls of both the first rolls 25 and third rolls 28. The lower rolls of the first and third rolls 25; 28 therefore act primarily as guides during the initial guiding of the the wire through the machine during setting-up. Therefore it will be understood that the guiding function of the rolls 25, 26 and 28 could be performed by slotted members through which the wire 8 would pass to be correctly orientated. Slotted members could also be used as an alternative twisting means instead of the rollers in FIG. 4.

In a preferred embodiment of the twisting means the gap between the rollers or the width of the slot is significantly less than the width of the rolled wire so that the wire is constrained to twist.

Whilst the copper wire described with reference to FIG. 2 is shaped by rolling, the flattened surface required may alternatively be produced by passing the wire through a drawing die.

Although the invention has been described in terms of a round wire flattened to have two elongate planar surfaces, it will be understood that only the wire surface which contacts the workpiece need be flat. The surface of the wire which contacts the welding pressure wheels may, if desired, be curved and have a cross-section in the form of a semi-circle or an ellipse. However wires having such a curved surface will not be as easy to guide during twisting as is the wire having two flat surfaces.

What I claim is:

1. A method of operating a resistance welding machine of a kind having a wire electrode adapted to be urged into contact with a workpiece by a first electrode wheel and a second electrode wheel, said method including the steps of, feeding to the machine a wire having first and second surfaces extending parallel to the axis of the wire; moving the wire around a first electrode wheel to present the first surface of the wire to the workpiece and the second surface to the first electrode wheel, twisting the wire about its axis through an angle whilst moving the wire in an axial direction to present said second surface to said second electrode wheel; and presenting said first surface to the workpiece while the second surface of the wire is supported by the second electrode wheel.

2. A method according to claim 1 wherein the method includes the step of shaping a substantially round wire to have a first and second surface extending parallel to the axis of the wire.

3. A method according to claim 2 wherein the wire is shaped by rolling.

4. A method according to claim 2 wherein the wire is shaped by drawing through a die.

5. A method according to claims 1, 2, 3 or 4 wherein the wire is twisted by linear passage between guide means such as rolls or slots.

6. A resistance welding machine of a kind having a wire electrode adapted to be urged into contact with a workpiece by first and second electrode wheels, said apparatus including a wire having first and second surfaces extending parallel to the axis of the wire, and twisting means located in the path of the wire after the first electrode wheel and before the second electrode wheel, said twisting means being adapted to twist the wire during linear motion of the wire so that the surface of the wire presented to the workpiece at the first electrode wheel is also presented to the workpiece at the second electrode wheel.

7. A resistance welding machine according to claim 6, having means to shape a substantially round wire to have first and second surfaces extending parallel to the axis of the wire.

8. A resistance welding machine according to claim 7 wherein the wire is shaped by rolling.

9. A resistance welding machine according to claim 8 wherein the wire is shaped by drawing through a die.

10. A resistance welding machine according to claims 6, 7, 8 or 9 wherein the twisting means includes a first pair of rolls to orientate the wire; a second pair of rolls, rotatable about axes set at 90° to the axis of the first pair of rolls, and a third pair of rolls rotatable about axis parallel to the axes of the first pair of rolls to twist the wire about its longitudinal axis through 180°.

11. Apparatus according to claim 10 having at least one guide roll to guide the wire into the next pair of rolls during twisting.

12. Apparatus according to claim 10 having at least one further pair of rolls adapted to twist the wire through less than 90° said at least one further pair of rolls being placed between said first and second pair of rolls or between said second and third pair of rolls.

13. A resistance welding machine according to claim 12 wherein the axis of said further set of rolls is set at 90° to the axes of said second pair of rolls so that the wire is twisted through 180°.

14. Apparatus according to claim 11 having at least one further pair of rolls adapted to twist the wire through less than 90°, said at least one further pair of rolls being placed between said first and second pair of rolls or between said second and third pair of rolls.

* * * * *